(12) United States Patent
Gromoll

(10) Patent No.: US 7,816,826 B2
(45) Date of Patent: Oct. 19, 2010

(54) THERMOSYPHON COOLED SUPERCONDUCTOR

(75) Inventor: Bernd Gromoll, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 310 days.

(21) Appl. No.: 11/883,744

(22) PCT Filed: Feb. 1, 2006

(86) PCT No.: PCT/EP2006/050575

§ 371 (c)(1),
(2), (4) Date: Aug. 6, 2007

(87) PCT Pub. No.: WO2006/082194

PCT Pub. Date: Aug. 10, 2006

(65) Prior Publication Data

US 2009/0121561 A1 May 14, 2009

(30) Foreign Application Priority Data

Feb. 4, 2005 (DE) .................. 10 2005 005 283

(51) Int. Cl.
*H02K 1/32* (2006.01)
*H02K 9/00* (2006.01)
*H02K 9/06* (2006.01)
*H02K 55/00* (2006.01)

(52) U.S. Cl. .............. 310/61; 310/52; 310/53; 310/54; 310/55; 310/56; 310/57; 310/58; 310/59; 310/60 R; 310/62; 310/63

(58) Field of Classification Search .......... 310/51–63; H02K 55/00, 1/32, 9/00, 9/06
See application file for complete search history.

(56) References Cited

U.S. PATENT DOCUMENTS 3,821,018 A 6/1974 Grant (Continued)

FOREIGN PATENT DOCUMENTS

DE 694 10 281 T2 1/1999

(Continued)

OTHER PUBLICATIONS porous lining1.pdf : Channabasappa et al ("Heat transfer by rotational flow in an annulus with porous lining", Indian J. pure appl. Math, 14(6); 741-756, Jun. 1983).*

(Continued)

*Primary Examiner*—Quyen Leung
*Assistant Examiner*—John K Kim
(74) *Attorney, Agent, or Firm*—Staas & Halsey LLP

(57) ABSTRACT

A machine has a rotor, that can be rotated about an axis, with a superconductive winding that is coupled in a heat-conducting manner to a central coolant area of a fixed heat conducting body proturding into a hollow of the rotor via a winding carrier and a heat contact gas. The coolant area forms a line system with the line parts thereof, that are laterally connected thereto, and a condenser area of a cold unit, in which a coolant circulates in the line system as result of a thermosiphon effect. To maintain the supply of coolant to the central coolant area, even when the rotor encounters difficulties, the coolant area is provided with a lining of a porous material, preferably a sinter material, having high thermal conductivity.

9 Claims, 1 Drawing Sheet

U.S. PATENT DOCUMENTS

| | | | |
|---|---|---|---|
| 5,283,488 A * | 2/1994 | Ponnappan et al. | 310/55 |
| 6,376,943 B1 | 4/2002 | Gamble et al. | |
| 6,498,127 B1 * | 12/2002 | Niwa et al. | 508/104 |
| 6,528,909 B1 * | 3/2003 | Kan et al. | 310/52 |
| 6,597,082 B1 * | 7/2003 | Howard et al. | 310/254.1 |
| 7,101,087 B2 * | 9/2006 | Hiramatsu et al. | 384/279 |
| 2001/0030040 A1 | 10/2001 | Xiao | |
| 2003/0235355 A1 * | 12/2003 | Hiramatsu et al. | 384/276 |
| 2004/0056541 A1 | 3/2004 | Steinmeyer | |
| 2005/0175947 A1 * | 8/2005 | Ichikawa et al. | 431/344 |
| 2006/0158059 A1 * | 7/2006 | Steinmeyer et al. | 310/261 |

FOREIGN PATENT DOCUMENTS

| | | |
|---|---|---|
| DE | 100 39 964 A1 | 3/2002 |
| DE | 100 57 664 A1 | 5/2002 |
| WO | 00/13296 | 3/2000 |
| WO | 02/15370 A1 | 2/2002 |

OTHER PUBLICATIONS porous lining2.pdf : Channabasappa et al ("Heat transfer by rotational flow in an annulus with porous lining", Wairme und Stoffübertragung 20, 243-248 (1986)).* porous lining1.pdf : Channabasappa et al ("Heat transfer by rotational flow in an annulus with porous lining", Indian J. pure appl. Math, 14(6); 741-756, Jun. 1983).* porous lining2.pdf : Channabasappa et al ("Heat transfer by rotational flow in an annulus with porous lining", Wairme und Stoffübertragung 20, 243-248 (1986)).*

"Gmelins Handbuch der Anorganischen Chemie: Kupfer, Part A", vol. 13, System No. 60, 8th Ed., 1955, pp. 956-957.

P. D. Bentley et al.; A Rotatable Cryogenic Target for Use with Molecular Beams; Journal of Physics E: Scientific Instruments, vol. 6, 1973, pp. 833-836.

K. Jikihara et al., "A Cryocooler Cooled 10.7T Superconducting Magnet with a Room Temperature Bore of 52 mm," Proceedings of the Sixteenth Int'l Cryogenic Eng. Conf./Int'l Cryogenic Materials Conf.; Part 1; May 1996; pp. 1109-1112.

Y. Ohtani et al., "Development of a 11.5T Liquid Helium-Free Superconducting Magnet System," Proceedings of the Sixteenth Int'l Cryogenic Eng. Conf./Int'l Cryogenic Materials Conf.; Part 1; May 1996; pp. 1113-1116.

K. Timms et al., "A Cryofree Superconducting Magnet," Proceedings of the Sixteenth Int'l Cryogenic Eng. Conf./Int'l Cryogenic Materials Conf.; Part 1; May 1996; pp. 1117-1120.

K. Watanabe et al., "Cryocooler-Cooled Large Bore NbTi Superconducting Magnet Using High Temperature Superconducting Current Leads," Proceedings of the Sixteenth Int'l Cryogenic Eng. Conf./Int'l Cryogenic Materials Conf.; Part 1; May 1996; pp. 1121-1124.

H. Isogami et al., "A Superconducting Magnetic Separator with an Integral Refrigerator for Blue-Green Algae," Proceedings of the Sixteenth Int'l Cryogenic Eng. Conf./Int'l Cryogenic Materials Conf.; Part 1; May 1996; pp. 1125-1128.

K. Shibutani et al., "Design and Fabrication of Cryogen Free Superconducting Magnet," Proceedings of the Sixteenth Int'l Cryogenic Eng. Conf./Int'l Cryogenic Materials Conf.; Part 1; May 1996; pp. 1129-1132.

International Search Report for Application No. PCT/EP2006/050575; mailed Jun. 26, 2006.

German Office Action for Application No. 10 2005 005 283.5-32; dated Dec. 14, 2005.

Bentley, P.D., et al., "A rotatable cryogenic target for use with molecular beams", Journal of Physics E: Scientific Instruments, 1973, vol. 6, pp. 833-836.

Communication from the European Patent Office dated Feb. 18, 2010 in the related European application No. 06 724 830.2

* cited by examiner

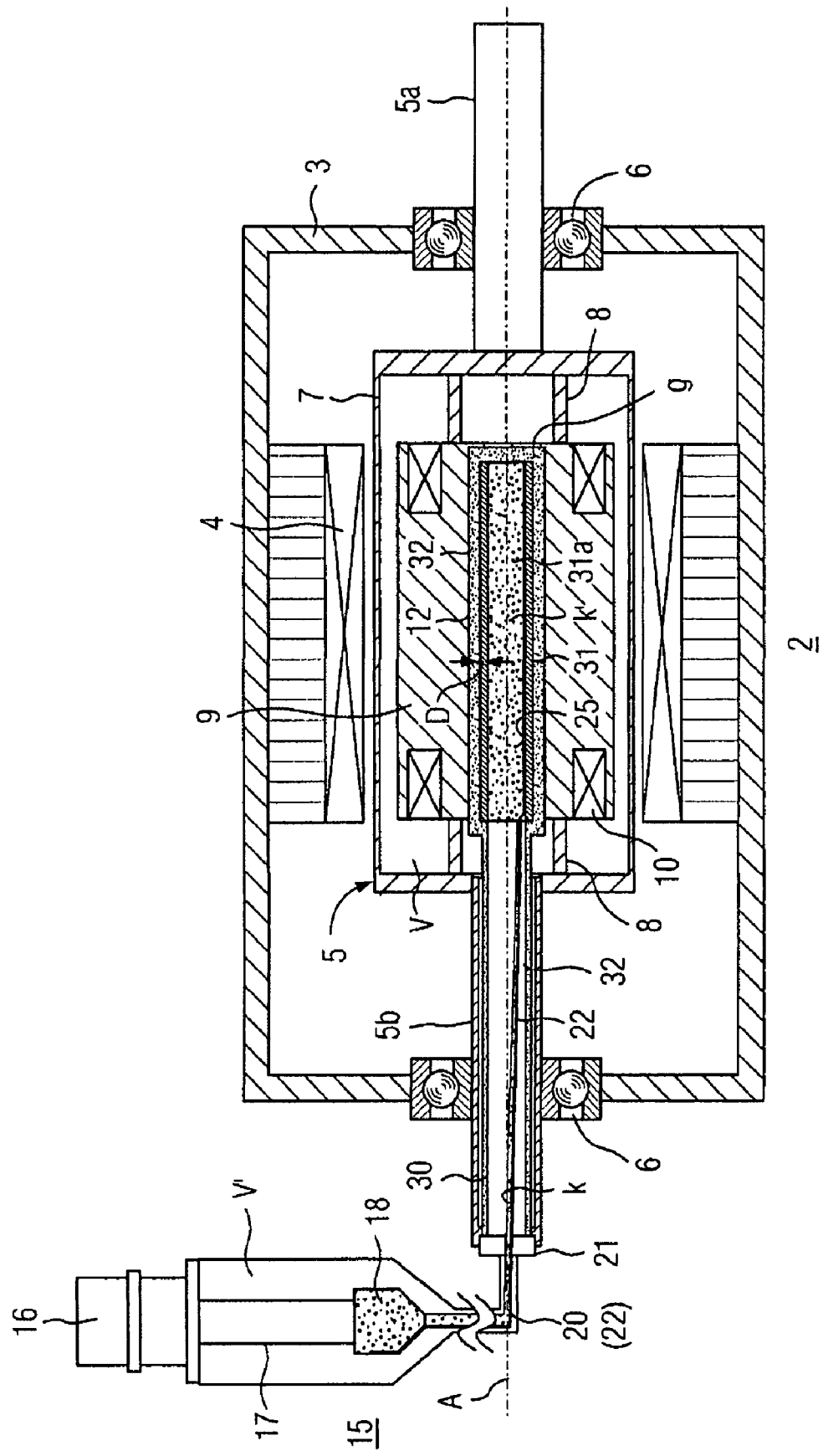

THERMOSYPHON COOLED SUPERCONDUCTOR

CROSS REFERENCE TO RELATED APPLICATIONS

This application is based on and hereby claims priority to German Application No. 10 2005 005 283.5 filed on Feb. 4, 2005, the contents of which are hereby incorporated by reference.

BACKGROUND

Described below is a machine system
a) having a rotor which can be rotated about a rotation axis, is enclosed by a stator and has at least one rotor winding whose superconductive conductors are thermally conductively coupled to a central cylindrical rotor cavity extending in the axial direction,
b) having a thermally conductive body, which has a central refrigerant space and projects statically into the rotor cavity while maintaining an annular gap,
c) having a thermal contact gas located in the annular gap,
d) having a stationary refrigeration unit which is located outside the rotor and includes a condenser space
and
e) having tubular line sections extending between the central refrigerant space of the thermally conductive body and the condenser space of the refrigeration unit.

The central refrigerant space, the tubular line sections and the condenser space in this case form a closed line system, in which a refrigerant is circulated or can be circulated by utilizing the thermosiphon effect.

A corresponding machine system is disclosed by WO 02/15370 A1.

Metal oxide superconductor materials with critical temperatures Tc above 77 K have been known since 1987. These materials are therefore also referred to as high-Tc superconductor materials or HTS materials, and in principle they permit a cooling technique using liquid nitrogen (LN2).

Attempts are also being made to produce superconducting windings of machines with conductors which employ such HTS materials.

It has, however, been found that previously known HTS conductors have a comparatively low current-carrying capacity in magnetic fields with inductions in the tesla range. Despite the high critical temperature Tc per se of the materials being used, this often means that the conductors of such windings must still be kept at a temperature level lying below 77 K, for example between 10 and 50 K, so that they can carry significant currents when high field strengths occur. Such a temperature level is much higher than 4.2 K, the boiling temperature of liquid helium (LHe) with which known metallic superconductor materials with a comparatively low critical temperature Tc, so-called low-Tc materials or LTS materials, are cooled.

Refrigerating systems in the form of so-called cryo-refrigerators, with a closed pressurized He gas circuit, are preferably used to cool windings of HTS conductors in a temperature range below 77 K. Such cryo-refrigerators are in particular of the Gifford-McMahon or Stirling type, or are designed as so-called pulse-tube refrigerators. They also have the advantage that they are refrigerating power is available virtually at the touch of a button, and the handling of low-temperature liquids is avoided. When using such refrigerating systems, the superconducting winding is merely cooled indirectly by thermal conduction to a cold head of a corresponding refrigerator (cf. also for example "Proc. 16th Cryog. Engineering Conf. (ICEC 16)", Kitakyushu, J P, 20-24 May 1996, Elsevier Science Publishers, 1997, pages 1109 to 1129).

A corresponding refrigeration technique is also provided for the rotor of an electrical machine as disclosed by WO 02/15370 A1 mentioned in the introduction. The rotor contains a rotating winding of HTS conductors, which are located in a thermally conductively designed winding carrier. This winding carrier is equipped with a cylindrical rotor cavity extending in the axial direction. A central thermally conductive body, which encloses a central cylindrical refrigerant space, projects statically into this rotor cavity. In the hollow cylindrical annular gap formed between the co-rotating outer wall of the rotor cavity and the stationary outer wall of the thermally conductive body, there is a thermal contact gas for heat transfer between the winding carrier and the thermally conductive body. Stationary tubular line sections, extending laterally out of the rotor, connect with its central refrigerant space. These line sections lead into a refrigeration unit's condenser space lying geodetically higher, and they form a closed single-tube line system with this condenser space and the central refrigerant space. This line system contains a refrigerant, which circulates by utilizing a so called thermosiphon effect. Refrigerant condensed in the condenser space is conveyed by the tubular line sections into the central refrigerant space, where it absorbs heat because of the thermal coupling to the winding carrier via the thermal contact gas and therefore to the HTS winding to be cooled, and is at least partially evaporated. The evaporated part of the refrigerant then travels back through the same line sections into the condenser space, where it is re-condensed. The refrigerating power required for this is provided by a refrigerating machine, the cold head of which is thermally coupled to the condenser space. The return flow of the refrigerant to the refrigerating machine's parts acting as a condenser is driven by a slight positive pressure, which is formed in the central refrigerant space acting as an evaporator part. This positive pressure generated by the creation of gas in the evaporator part and the liquefaction in the condenser space leads to the desired return flow of refrigerant. The corresponding circulation is also referred to as natural convection.

Instead of this known single-tube thermosiphon line system in which the liquid refrigerant and the gaseous refrigerant flow through the same tube sections, double-tube line systems are also known for refrigerant recirculation by utilizing a thermosiphon effect (cf. for example WO 00/13296A). In this case, an additional tube for the gaseous refrigerant must be provided in the region of the hollow shaft of the rotor.

In the known machines with thermosiphon cooling, the refrigerant is thus transported merely by utilizing natural convection so that no other pump systems are necessary. If such a machine system is intended to be used on ships or offshore installations, then it is often necessary to deal with static trims of up to ±5° and/or dynamic trims of up to ±7.5° in the longitudinal direction. In order to receive approval from a classification society for use on ships, the cooling system of such a machine system must consequently ensure reliable cooling even under these conditions. If trims of the machine are intended to be tolerated, however, the risk arises that a region of the tubular line parts between the central refrigerant space and the refrigeration unit will come to lie geodetically lower than the central refrigerant space. The effect of this would be that, under the effect of gravity, the refrigerant can no longer reach the refrigerant space. Cooling of the machine and thus operation thereof would therefore no longer be ensured.

In order to counter this risk, the following proposals inter alia are known:

One simple solution might consist in arranging the machine inclined relative to the horizontal so that, in the thermosiphon line system, there is still a gradient in the direction of the central refrigerant space even in the event of the greatest expected trim or oscillation amplitude. A correspondingly inclined arrangement is undesirable particularly in the maritime sector, especially with sizeable machine lengths, because of the large space requirement then entailed.

In principle, the refrigerant may also be forcibly circulated by a pump system. Considerable equipment outlay is necessary for this, however, especially when the refrigerant is intended to be at a temperature level of for example 25 to 30 K. Such circulation systems furthermore cause significant heat losses, and can scarcely fulfill the service life requirements of the maritime sector with its long maintenance intervals.

SUMMARY

An aspect is to configure the machine system to include a machine with an associated refrigeration unit having the features mentioned in the introduction, so that a sufficient cooling effect can still be achieved by the refrigerant in the central refrigerant space even under realistically assumable oblique settings or trims of its rotor, such as may occur during use on ships or offshore installations.

Accordingly, in the machine system having the features mentioned in the introduction, the central refrigerant space is at least partially provided with a lining made of a porous material with high thermal conductivity, which forms capillary-like structures or cavities accessible for the refrigerant.

The lining of the inner wall of an internally hollow thermally conductive body, projecting into the rotor cavity substantially like a stationary cold finger, then provides the advantage in particular that sufficiently uniform distribution of the refrigerant is achieved owing to the capillary effect even in the event of an inclined axis. Good wetting of the porous material can be ensured in this way. Since this material is intended to have a sufficiently high thermal conductivity, good thermal coupling of the conductors to be cooled can then be ensured to the refrigerant via the winding carrier enclosing the rotor cavity, via the thermal contact gas present in the annular gap and the wall of the thermally conductive body with its special lining.

Thus, the porous material may preferably be a sintered material, in particular made of or including copper (Cu). A sintered material in this context is intended to mean any material of high thermal conductivity, which is formed by powder metallurgy through compression and heating while still having a porosity sufficient for the required capillary action.

The refrigerant space's lining made of sintered material may in particular be press-fitted or shrink-fitted into it. The desired lining can readily be produced by corresponding methods.

Thus, the lining of the porous material may in particular have a porosity of at least 3%, preferably at least 10%, so as to provide a sufficiently large surface wettable with the refrigerant for the required capillary action.

Those materials whose thermal conductivity is at least 100 W per (m·K) at the operating temperature of the superconducting material are particularly effective. Copper (Cu) material in particular readily fulfills this condition, since its thermal conductivity has a value which lies above the stated minimum value.

Instead of a lining formed of a sintered material, a correspondingly porous coating is also possible.

BRIEF DESCRIPTION OF THE DRAWINGS

These and other objects and advantages will become more apparent and more readily appreciated from the following description of a preferred exemplary embodiment of a machine system, taken in conjunction with the accompanying drawing of which:

The single FIGURE shows a longitudinal section through a machine system in a schematized representation.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Machine systems according to the description herein include a machine or motor and an associated refrigeration unit. The embodiment of such a machine specified below with the aid of the FIGURES may in particular be a synchronous motor or a generator. The machine includes a rotating superconducting winding, which in principle allows the use of metallic LCS material or oxidic HTS material. The following exemplary embodiment will preferably be based on the latter material. With corresponding conductors, the winding may be a coil or a system of coils in a 2-pole, 4-pole or other multipole arrangement. The basic structure of a corresponding synchronous motor is disclosed by the FIGURE, based on the embodiment of a machine system known from WO 02/15370 A1 mentioned in the introduction (FIG. 5 in conjunction with FIGS. 2 and 3).

The machine denoted by 2 has a stationary outer housing 3 at room temperature with a stator winding 4. Inside the outer housing and enclosed by the stator winding 4, a rotor 5 is mounted so that it can rotate about a rotation axis A in bearings 6. These bearings may be conventional mechanical bearings, or alternatively magnetic bearings. The rotor furthermore includes a vacuum vessel 7 in which a winding carrier 9 having an HTS winding 10 is held on for example hollow cylindrical, torque-transmitting suspension elements 8. This winding carrier contains a central rotor cavity 12, extending in the axial direction concentrically with the rotation axis A, which for example has a cylindrical shape. The winding carrier is configured vacuum-tightly in relation to this cavity. It seals it on one side of the rotor, which is mounted on a solid axial rotor shaft section 5a on this side.

On the opposite rotor side, there is a tubular rotor shaft section 5b into which a static sleeve tube 30 projects, which is connected to a central thermally conductive body 31 in the region of the central rotor cavity. A hollow cylindrical annular gap 32 is maintained in relation to the co-rotating walls of the rotor shaft section 5b and the central rotor cavity 12. For gas-tight sealing of this annular gap, the rotor cavity 12 of the winding carrier is closed on the side facing the rotor shaft section 5a. On the opposite side, the annular gap 32 is sealed on the tubular rotor shaft section 5b by a sealing instrument 21 (not described in further detail) having at least one seal. The annular gap is filled with a thermal contact gas g, preferably helium or for temperatures above an operating temperature of 30 K neon. Thermal contact between the thermally conductive body 31 and that wall of the winding former 9 which delimits the rotor cavity 12 is provided via this contact gas. The winding former should be configured so that it is sufficiently thermally conductive, i.e. it has highly thermally conductive parts between the wall of the rotor cavity 12 and the winding 10. In this way, via the winding former 9, the thermal contact gas g and the wall of the thermally conductive body 31, the winding is straightforwardly coupled thermally to the inner space 31a of this thermally conductive body. Highly thermally conductive metals such as Al or Cu may therefore be envisaged as a material for the cylindrical thermally conductive body.

A refrigeration unit denoted overall by 15, of which only a cold head 16 is indicated in detail, is provided for indirect cooling of the HTS winding 10 via the thermally conductive parts of the winding carrier 9. This refrigeration unit known per se may be a cryo-refrigerator of the Gifford-McMahon type or, in particular, a regenerative cryo-refrigerator such as for example a pulse-tube refrigerator or a split Stirling refrigerator. The cold head 16, and therefore all the other essential parts of the refrigeration unit, lie outside the rotor 5 or its outer housing 3.

The cold part of the cold head 16, arranged for example several meters laterally from the rotor 5, lies in good thermal contact in a vacuum vessel 23 via a heat transfer body 17 with a refrigerant condensation unit, which includes a condenser space 18. A vacuum-insulated stationary warm tube 20, which extends in an axial region into the co-rotating cavity 13 or the central refrigerant space 20, is connected to this condenser space. The sealing device 21 (not further described in the FIGURE) with at least one sealing element, which may be designed as a ferrofluid seal and/or a labyrinth seal and/or a gap seal, is used in order to seal the warm tube 20 or the sleeve tube 31 relative to the lateral shaft section 5b. The central refrigerant space 31a is connected outward in a gas-tightly sealed fashion via the warm tube 20 and the lateral sleeve tube 30 to the heat exchange region of the condenser space 18. The tubular parts extending between the central refrigerant space 31a and the condenser space 18, which are used to receive a refrigerant, are generally referred to as line sections 22. Together with the condenser space 18 and the central refrigerant space 31a, these line sections will be considered as a line system.

These spaces of this line system are filled with a refrigerant, which will be selected depending on the desired operating temperature of the HTS winding 10. For example hydrogen (condensation temperature 20.4 K at standard pressure), neon (condensation temperature 27.1 K at standard pressure), nitrogen (condensation temperature 77.4 K at standard pressure) or argon (condensation temperature 87.3 K at standard pressure) may be envisaged. Mixtures of these gases may also be provided. The refrigerant is circulated by utilizing a so-called thermosiphon effect. To this end, the refrigerant is condensed on a cold surface of the cold head 16 in the region of the condenser space 18. The refrigerant thus liquefied, denoted by k, subsequently flows through the line sections 22 into the central refrigerant space 31a. The condensate is in this case transported under the effect of gravity. In the interior of the rotor, the liquid refrigerant is then at least partially evaporated in the stationary refrigerant space 31a. The refrigerant in vapor form is denoted by k'. This refrigerant evaporated by absorbing heat then flows through the interior of the line sections 22 back into the condenser space 18. The return flow will be initiated by a slight positive pressure in the refrigerant space 31a acting as an evaporator in the direction of the condenser space 18, which is caused by the formation of gas in the evaporator and the liquefaction in the condenser space. Since the circulation of the liquefied refrigerant from the condenser space 18 into the central refrigerant space 31a and the return flow of the evaporated refrigerant k' from this refrigerant space back to the condenser space take place in the tubular line system formed by the condenser space 18, the line sections 22 and the refrigerant space 12, they may be regarded as a single-tube system with circulation of the refrigerant k, k' by utilizing a thermosiphon effect. Known multitube line systems, which permit thermosiphon circulation, may of course also be used for the machine system.

When the machine 2 is being used on ships or offshore installations, trims may occur at which the rotation axis A is inclined by an angle of a few degrees relative to the horizontal H. Although condensation of the refrigerant in the condenser space 18 then still takes place as before, the refrigerant cannot however any longer reach the central refrigerant space 31a so that the line sections 22 gradually fill up with the liquid refrigerant k, especially in the region near the axis. With a comparatively minor filling level of the line system with refrigerant, the rotor interior or the refrigerant space 31a can then run dry and will therefore no longer be cooled. With a greater filling level of the line system, the return flow of the gaseous refrigerant k' in the line sections 22 toward the condenser space 18 will become blocked by accumulated liquid refrigerant after a certain time. Reliable cooling of the rotor or its superconducting winding is likewise no longer ensured in this case.

For this reason, as revealed by the FIGURE, a special lining 25 of a sufficiently porous material, preferably a sintered material, is provided on the inside of the thermally conductive body 31. Its thickness D generally lies between 0.1 and 2 mm. Such a sintered material will be selected for the exemplary embodiment. It is therefore possible to ensure that the liquid refrigerant k is distributed uniformly over the inner surface because of capillary forces in the sintered material even in the event of trims, so that uniform evaporation and therefore cooling can therefore be ensured. The lining 25 should furthermore include a material with high thermal conductivity, for example like that of copper. This should be at least 100 $W \cdot m^{-1} \cdot K^{-1}$ at a selected operating temperature of the superconducting material being used. The minimum value should preferably be 400 $W \cdot (m \cdot K)^{-1}$. For example, sintered Cu material has a thermal conductivity value of about 30 $W \cdot cm^{-1} \cdot degree^{-1}$ or 3000 $W \cdot m^{-1} \cdot K^{-1}$ at a temperature of 30 K (cf. "Gmelins Handbuch der Anorganischgen Chemie: Kupfer, Teil A" [Gmelins Handbook of Inorganic Chemistry: Copper, Part A], 8th edition 1995, page 957).

The lining 25 is in good thermal contact with the thermally conductive body 31, which, for example, may be achieved by a shrink connection or by pressing it in.

A corresponding lining may also be provided in the form of a layer, which is achieved by coating the inner surface of the thermally conductive body 31 with a material. A sufficiently porous stucture is then to be ensured, so that the required capillary forces can be effective.

The porosity of the lining 25 or its material should to this end be at least 3%, preferably at least 10%. During operation under rotation with an inclined axis, the lining then causes uniform distribution of the liquid refrigerant k, the distribution of the refrigerant on the walls or surfaces of the refrigerant paths provided by the structures or cavities being further assisted by the centrifugal forces occurring.

With a lining as described above, it is thus possible to ensure uniform heat loss dissipation over the entire hollow cylindrical inner surface of the thermally conductive body 31, both in the operating state and under rotation in operation irrespective of the inclination of the motor axis A.

The parts or containers enclosing the refrigerant k or k' must of course be protected against ingress of heat. A vacuum environment is therefore expediently provided for their thermal insulation, in which case insulating means such as super-insulation or insulating foam may optionally also be provided in the corresponding vacuum spaces. In the FIGURE, the vacuum enclosed by the vacuum vessel 7 is denoted by V. It furthermore encloses the sleeve tube 30 extending as far as the seal 21. The vacuum enclosing the warm tube 20, as well as the condenser space 18 and the heat transfer body 17, is denoted by V'. A negative pressure may optionally also be generated in the inner space 27 surrounding the rotor 5 and enclosed by the outer housing 3.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A machine system, comprising:

a stator;

a rotor, rotatatable about a rotation axis extending along an axial direction, substantially surrounded by said stator and having a central cylindrical rotor cavity extending in the axial direction and at least one rotor winding with superconductive conductors thermally conductively coupled to the central cylindrical rotor cavity;

a thermally conductive body, projecting statically into the central cylindrical rotor cavity while maintaining an annular gap therebetween, including a central refrigerant space at least partially provided with a lining made of a porous material with a thermal conductivity of at least 100 W/(m*K) at an operating temperature of the superconductive conductors, which forms capillary-like structures or cavities accessible for a refrigerant;

a thermal contact gas disposed in the annular gap;

a stationary refrigeration unit disposed outside said rotor and enclosing a condenser space; and tubular line sections extending between the central refrigerant space of said thermally conductive body and the condenser space of said stationary refrigeration unit, said tubular line sections, the central refrigerant space and the condenser space forming a closed line system in which the refrigerant is circulated by utilizing a thermosiphon effect.

2. The machine system as claimed in claim 1, wherein the porous material is a sintered material.

3. The machine system as claimed in claim 2, wherein a sintered copper material.

4. The machine system as claimed in claim 1, wherein the lining is a porous coating.

5. The machine system as claimed in claim 4, wherein a porosity of the lining is at least 3%.

6. The machine system as claimed in claim 5, wherein a value of the thermal conductivity of the porous material at the operating temperature of the superconductive conductors corresponds to at least that of pure copper.

7. The machine system as claimed in claim 6, wherein the superconductive conductors of the rotor winding are formed of a high-$T_c$ superconductor material.

8. A method for producing a machine system as claimed in 7, wherein the porous lining is press-fitted or shrink-fitted.

9. The machine system as claimed in claim 4, wherein the porosity of the lining is at least 10%.

* * * * *